United States Patent
Woffinden et al.

(10) Patent No.: US 7,451,272 B2
(45) Date of Patent: Nov. 11, 2008

(54) QUEUE OR STACK BASED CACHE ENTRY RECLAIM METHOD

(75) Inventors: Gary A. Woffinden, Overland Park, KS (US); Victor Penacho, Hollister, CA (US); Ronald N. Hilton, Cupertino, CA (US)

(73) Assignee: Platform Solutions Incorporated, Sunnyvale, CA (US)

( * ) Notice: Subject to any disclaimer, the term of this patent is extended or adjusted under 35 U.S.C. 154(b) by 209 days.

(21) Appl. No.: 11/254,291

(22) Filed: Oct. 19, 2005

(65) Prior Publication Data

US 2006/0085601 A1   Apr. 20, 2006

Related U.S. Application Data

(60) Provisional application No. 60/620,365, filed on Oct. 19, 2004.

(51) Int. Cl.
*G06F 12/00* (2006.01)
*G06F 13/00* (2006.01)
*G06F 13/28* (2006.01)

(52) U.S. Cl. .................................. 711/118; 710/18

(58) Field of Classification Search ................... 711/118
See application file for complete search history.

(56) References Cited

U.S. PATENT DOCUMENTS

| 6,131,144 | A | 10/2000 | Koppala | 711/132 |
| 6,237,065 | B1 * | 5/2001 | Banerjia et al. | 711/133 |
| 2003/0088739 | A1 * | 5/2003 | Wilkes et al. | 711/133 |

FOREIGN PATENT DOCUMENTS

| EP | 1 011 049 A2 | 6/2000 |
| EP | 1011049 A2 * | 6/2000 |

* cited by examiner

*Primary Examiner*—Matt Kim
*Assistant Examiner*—Edward J Dudek
(74) *Attorney, Agent, or Firm*—Kenyon & Kenyon

(57) ABSTRACT

A method and system of organizing a cache memory system based on a temporal-access pattern is disclosed. One or more data entries may be stored in a memory. One or more cache entries of the one or more data entries may be stored in a temporal cache. The one or more cache entries may be physically organized based on a temporal access pattern. A cache entry of the one or more cache entries may be based upon a condition.

20 Claims, 6 Drawing Sheets

100

200

300

400

500

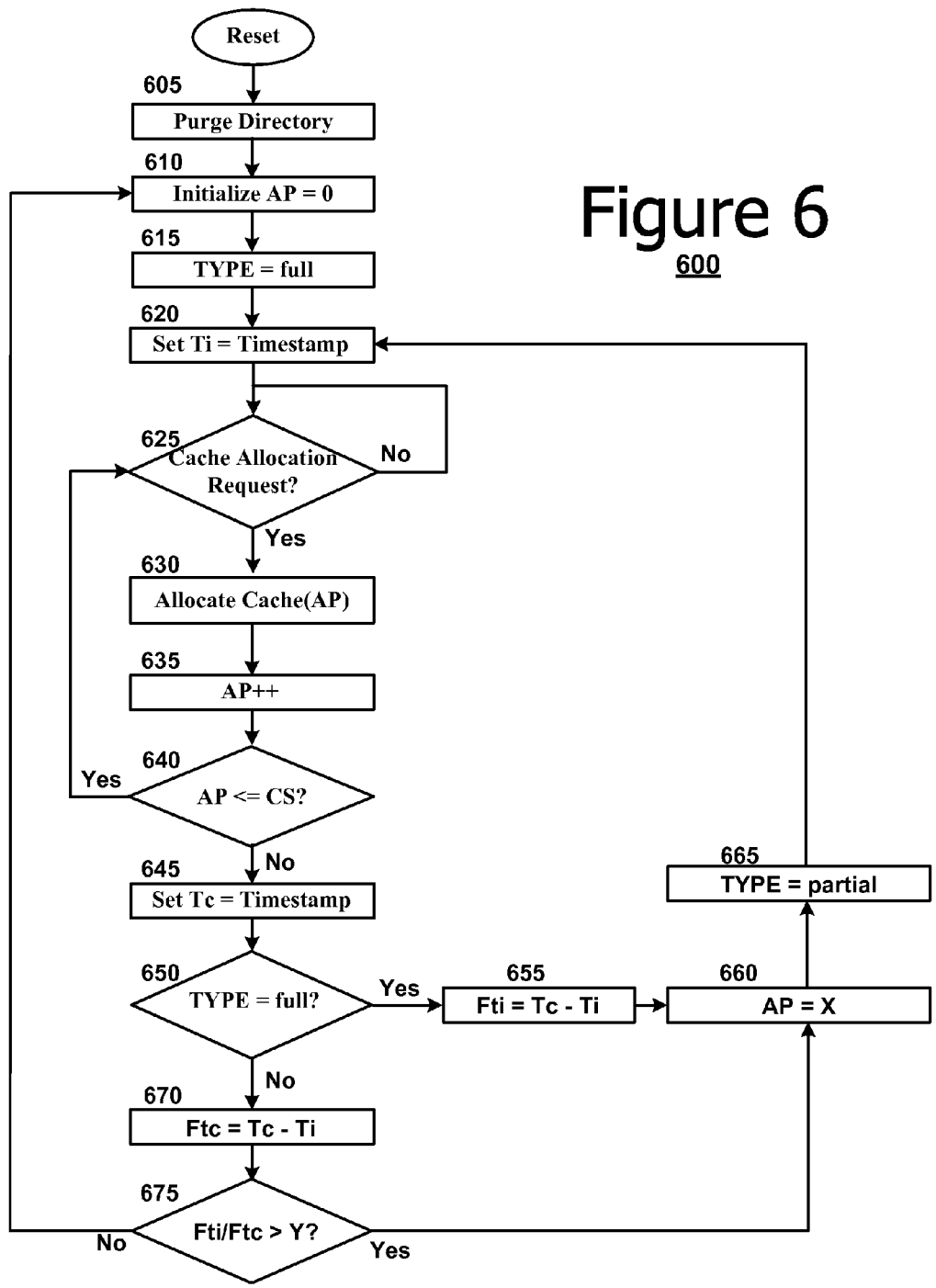

QUEUE OR STACK BASED CACHE ENTRY RECLAIM METHOD

RELATED APPLICATIONS

The present application claims priority from Provisional Application 60/620,365, filed on Oct. 19, 2004.

BACKGROUND

The present invention relates to caching the memory of a computer system and, in particular, to a cache with a temporal-spatial organization.

As is known in the art, the system cache in a computer system serves to enhance the system performance of modern computers. For example, a cache may maintain data between a processor and relatively slower system memory by holding recently accessed memory locations in case they are needed again. The presence of a cache allows the processor to continuously perform operations utilizing the data in the faster-accessing cache.

In a traditional cache design, the spatial organization of the cache mirrors that of the larger memory of which the cache is a subset. When a data from a requested address is not present in a cache, a cache entry must be allocated to receive the requested data. In a spatially-organized cache the replacement choice is often made using a least-recently-used method to select the cache entry to allocate from a small set of eligible candidates.

SUMMARY OF THE INVENTION

A method and system of organizing a cache memory system based on a temporal-access pattern is disclosed. One or more data entries may be stored in a memory. One or more cache entries of the one or more data entries may be stored in a temporal cache. The one or more cache entries may be physically organized based on a temporal access pattern. A cache entry of the one or more cache entries may be replaced based upon a condition

BRIEF DESCRIPTION OF THE DRAWINGS

FIG. 6 is a flowchart of one embodiment of a method of detecting the transition to a new working set.

DETAILED DESCRIPTION

A method and system of organizing a cache memory system based on a temporal-access pattern is disclosed. By spatially organizing the cache in a manner that reflects the temporal access pattern, the replacement methods may be greatly improved and simplified. A cache may be organized as a queue or a stack. A queue cache may include an access bit with each cache entry, to determine whether an entry has been recently accessed. The stack cache may purge a certain percentage of the cache entries when the cache becomes full. If the refill time on the cache is less than a set percentage of the initial fill time, the cache may be completely purged.

Figure 1:
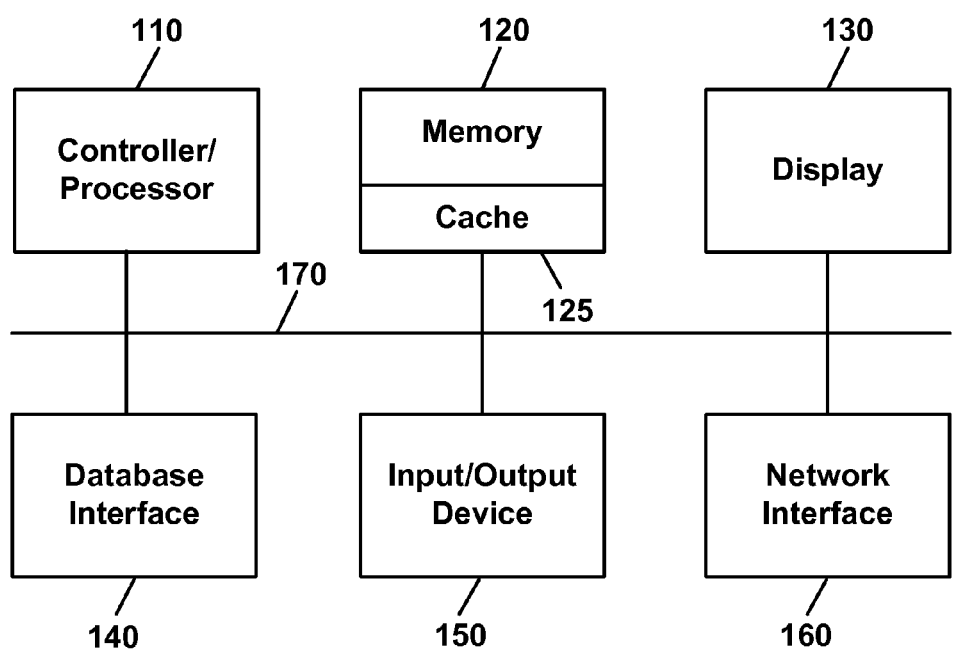
FIG. 1 is a diagram of a possible configuration of a computer system to execute the present invention.

FIG. 1 illustrates a possible configuration of a computer system 100 to execute the present invention. The computer system 100 may include a controller/processor 110, memory 120, display 130, database interface 140, input/output device interface 150, and network interface 160, connected through bus 170.

The controller/processor 110 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The Input/Output interface 150 may be connected to one or more input devices that may include a keyboard, mouse, pen-operated touch screen or monitor, voice-recognition device, or any other device that accepts input. The Input/Output interface 150 may also be connected to one or more output devices, such as a monitor, printer, disk drive, speakers, or any other device provided to output data.

The memory 120 may include volatile and nonvolatile data storage, including one or more electrical, magnetic or optical memories such as a RAM, cache, hard drive, CD-ROM drive, tape drive or removable storage disk. The memory may have a caching system 125 for speeding access to various memory data entries. The caching system 125 may be internal or external to the memory 120. The memory 120 may have an internal memory controller, or may be controlled by a memory controller on the processor 110.

The network interface 160 may be connected to a communication device, modem, network interface card, or any other device capable of transmitting and receiving signals over a network 130. The components of the computer system 100 may be connected via an electrical bus 170, for example, or linked wirelessly.

Client software and databases may be accessed by the controller/processor 110 from memory 120 or through the database interface 140, and may include, for example, database applications, word processing applications, the client side of a client/server application such as a billing system, as well as components that embody the decision support functionality of the present invention. The computer system 100 may implement any operating system, such as Windows or UNIX, for example. Client and server software may be written in any programming language, such as ABAP, C, C++, Java or Visual Basic, for example.

Figure 2:
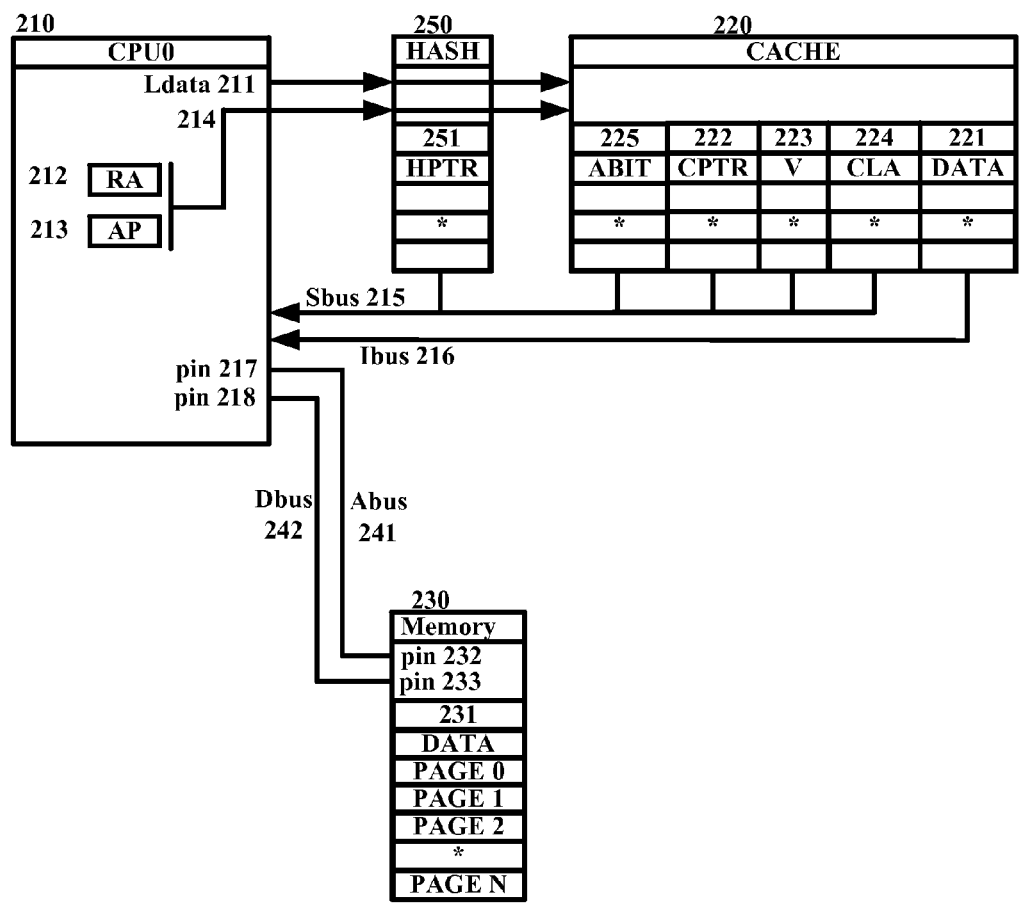
FIG. 2 is a diagram of one embodiment of a queue cache according to the present invention.

FIG. 2 illustrates in a block diagram one embodiment of a queue or First-In, First-Out (FIFO) temporal-spatial cache design 200. A central processor (CPU) 210 may access entries in a cache 220. The CPU 210 may also provide data via the local data bus (Ldata) 211 to the cache 220 for updating the entries. The CPU 210 may provide a request address (RA) 212 or an allocation pointer address (AP) 213 to the cache system 220 via the address path 214. CPU0 210 may have a status bus (Sbus) 215 to receive status information from the data cache 220 and an instruction data bus (Ibus) 216 to receive data 221 from the data cache 220. The cache entry 220 may also include a cache pointer 222, a valid bit 223, and a cache logical address 224. The data 221 may have been written to the cache 220 by the CPU 210 from a data page 231 stored in memory 230. The system 200 may include a system address bus (Abus) 241 to transmit memory addresses from CPU 210 through Abus pin 217 to Memory 230 via Address pin 232. The system 200 may include a system data bus (Dbus) 242 to transmit between CPU 210 through Dbus pin 218 to memory 230 via data pin 233.

In one embodiment, the CPU 210 may use the RA 212 to index a hash table 250 to find a hash table pointer (HPTR) 251. The HPTR 251 is used to index a hash-table-anchored linked list search to look up the RA-requested cache data 221 in the cache 220. When a cache entry 220 is allocated to a RA 212, the cache entry 220 is deleted from its current linked list and added to the linked list anchored by the RA hash table entry 250. Other look-up and match schemes, such as content-addressable memories, for example, may be used in place of the hash table 250 or in conjunction with the hash table 250 as well.

As the FIFO acronym implies, cache entries 220 are allocated in a round-robin wrap-around fashion such that the first/oldest entry created is the first one that is considered for replacement once the cache becomes full. The rationale behind this approach is that the oldest entry may not have been accessed for a long time, which would suggest a low probability of its being accessed in the near future.

An allocation pointer (AP) 213 may be used to indicate which cache entry 220 is the next candidate to be replaced. The AP 213 may be implemented as a counter with a modulus equal to the number of cache entries (CS). When a cache entry indicated by AP 213 is considered for replacement, the access field (ABIT) 225 associated with the cache entry 220 at location mod(AP+K, CS) is "cleared" by setting ABIT 225 to '0'. If the AP 213 advances to an entry with an ABIT 225 of zero, then that entry 220 has not been accessed since having been cleared 'K' allocation considerations ago, suggesting that the entry is therefore a good candidate to be replaced. On the other hand, if the AP 213 advances to an entry with an ABIT 225 of one, that entry has been accessed in the preceeding 'K' allocation intervals and therefore may have a high probability of being accessed again in the near future. The entry may be reclaimed or preserved by simply advancing the allocation pointer 213 to consider the next entry until it finds a cache entry 220 with an ABIT 225 of zero. Static experimentation or dynamic feedback may be used to determine the optimum value of 'K' for best performance. When the system is reset or the cache is purged, the allocation pointer 213 may be initialized to the beginning of the cache, the ABIT array 225 cleared, and the hash table 250 and cache 220 purged.

If a large fraction of cache entries have the ABIT 225 set to 1, then the allocation method may have large delays searching through long series of cache entries before finding an entry with ABIT 225 of zero. To avoid such long delays, the allocation method may ignore the ABIT 225 and allocates a cache entry if the number of cache entries unsuccessfully considered exceeds a limit threshold (ALIMIT).

The single bit ABIT field 225 described above is the degenerate case of the more general N-bit ABIT implementation which may be reset to zero at mod(AP+K, CS) then incremented with each cache access until the maximum value $(2^N-1)$ is reached. This value may remain until the counter is again reset. The N-bit ABIT field 225 may give the allocation method a finer resolution to make the decision to allocate or preserve an entry. In an alternate embodiment, the ABIT field may be used by the cache replace entries based upon a condition other than number of accesses and time of access. These conditions may include privilege level, address, program identification, processor identification or other conditions. The ABIT field 225 in these situations may indicate the status of these other conditions.

Figure 3:
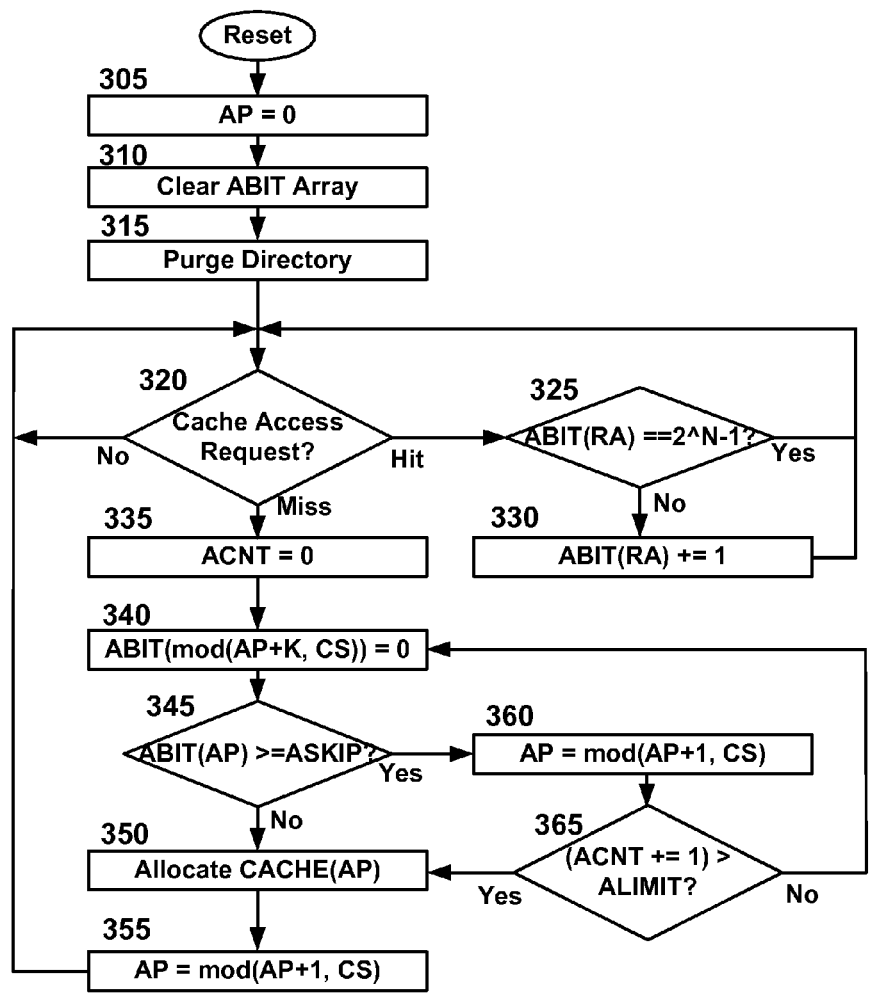
FIG. 3 is a flowchart of one embodiment of a method of marking which cache entries have been recently accessed.

FIG. 3 illustrates in a flowchart one embodiment 300 of a method of allocating cache entries. The processor 210 may initialize the allocation pointer (AP) 213 to 0 (Block 305), clear the ABIT array 225 (Block 310), and purge the hash table 250 and cache (Block 315). When the processor 210 requests data using a RA 212 that is present in the cache 210 (Block 320), or "hits," the ABIT field 225 for the requested cache entry (ABIT(RA)) 225 may be examined (Block 325). If the ABIT field 225 has not reached it maximum value $(2^N-1)$ (Block 325), the ABIT field 225 may be incremented (Block 330). If the ABIT field 225 may be a single bit, then ABIT(RA) field 225 may be set to one.

When the processor 210 requests data using a RA that is not present in the cache 230 (Block 320), or "misses," the CPU 210 may initiate a cache allocation request to allocate a cache entry 220 to receive the data. An access counter (ACNT) may be set to zero (Block 335). The ABIT field 225 for the cache entry 'K' entries ahead of the entry indicated by the AP 213 may be set to '0' (Block 340). The ABIT field 225 for the AP-indexed cache entry may be tested to determine if it is greater than the threshhold for allocation (ASKIP) (Block 345). If the ABIT field 225 consists of one bit, then ASKIP may be one. In general, if the ABIT field 225 consists of N bits, ASKIP may be set by the processor 210 to any value between 1 and $2^n-1$, depending on the frequency of access desired in order to preserve a cache entry. If the ABIT field 225 does not exceed the ASKIP threshhold, the AP_indexed cache entry may be allocated (Block 350) for new data and the AP may be incremented mod CS to point to the next cache entry to be considered for allocation (Block 355). If the ABIT field 225 does exceed the ASKIP threshhold (Block 345), the AP may be incremented mod CS to skip allocation of the cache entry and point to the next cache entry to be considered (Block 360). The ACNT counter may be incremented and tested against the skip threshhold (ACNT) (Block 365). If the skip threshhold is exceeded (Block 365), the AP-indexed cache entry may be allocated in spite of the ABIT field 225 (Block 350). If the skip threshhold is not exceeded, the AP_indexed cache entry may be considered for allocation (Block 340).

The allocation pointer may be implemented to advance in either an ascending or descending direction (+/−1), in which case 'K' must point in the same direction (+/−K). In the case of a software cache, such as would be employed in a just in time (JIT) translation-based system, which in turn runs on a processor that prefetches code into a hardware cache in the ascending direction, the allocation pointer for the software cache may advance in the opposite direction. Otherwise, the prefetch mechanism could get ahead of the JIT translator and load invalid code into the hardware cache, may have to be purged whenever a new software cache entry is created. By advancing the allocation pointer in the descending direction, the hardware cache may only need to be purged when the pointer wraps.

Figure 4:
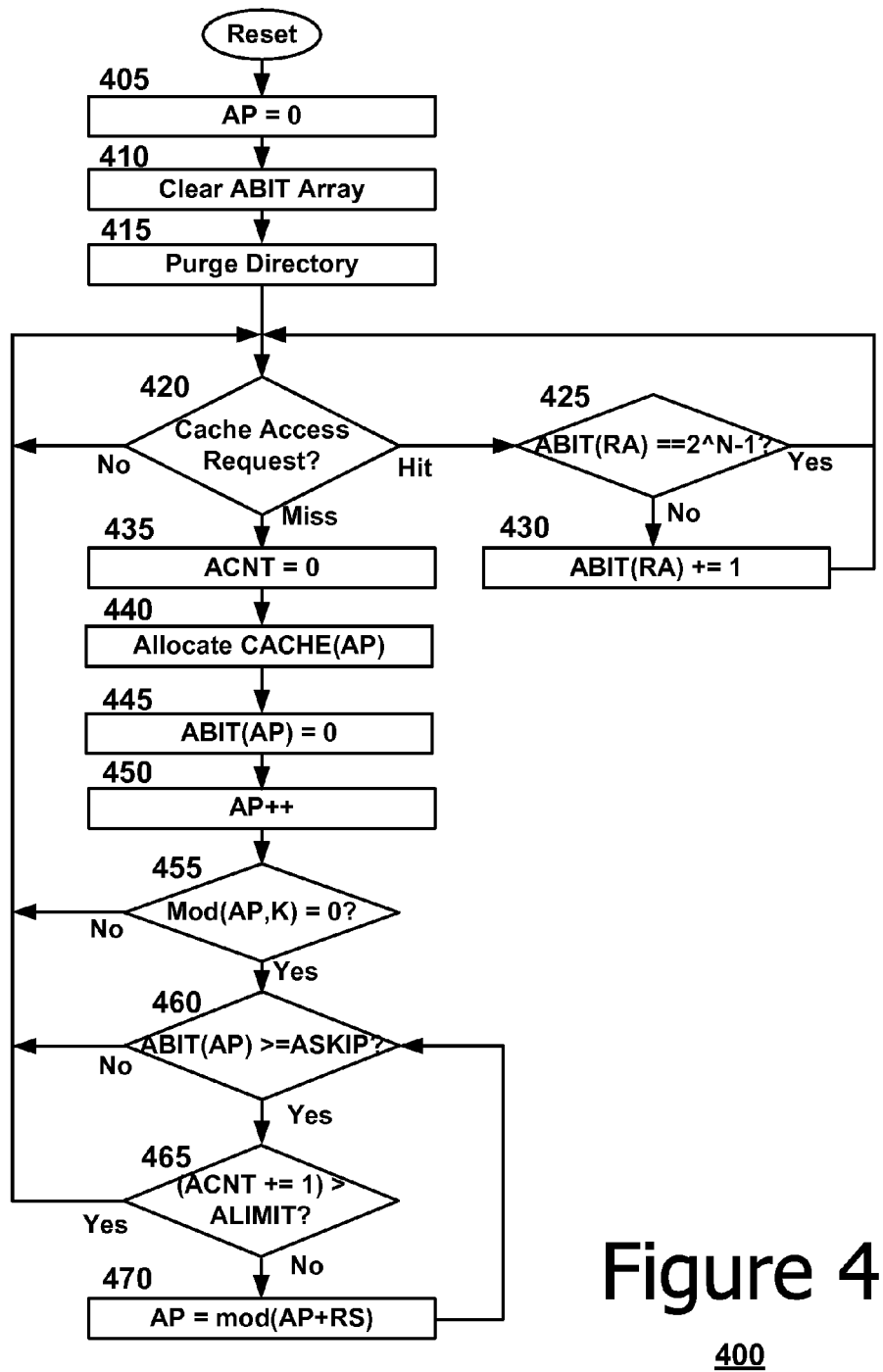
FIG. 4 is a flowchart of one embodiment of a method of storing cache entries.

FIG. 4 illustrates in a flowchart one embodiment 400 of a method of allocating cache entries in blocks of cache entries called regions. The system of FIG. 2 applies, but with one ABIT 235 field associated with an allocation region of a set number (RS) of consecutive cache entries. The processor 210 may initialize the allocation pointer (AP) 213 to 0 (Block 405), clear the ABIT array 225 (Block 410), and purge the hash table 250 and cache (Block 415). When the processor 210 requests data using a RA 212 that is present in the cache 210 (Block 420), or "hits," the ABIT field 225 for the requested cache entry (ABIT(RA)) 225 may be examined (Block 425). If the ABIT field 225 has not reached it maximum value (2^N−1) (Block 425), the ABIT field 225 may be incremented (Block 430). If the ABIT field 225 may be a single bit, then ABIT(RA) field 225 may be set to one.

When the processor 210 requests data using a RA 212 that is not present in the cache 230 (Block 420), or "misses," the CPU 210 may initiate a cache allocation request to allocate a cache entry 220 to receive the data. An access counter (ACNT) may be set to zero (Block 435). The cache entry indexed by AP 213 may be allocated (Block 440), the ABIT associated with the AP 213 may be set to zero (Block 445), and the AP 213 may be incremented to point to the next sequential cache entry (Block 450). If the AP 213 does not cross an allocation region boundary (mod(AP,K)>0) (Block 455), the CPU 210 may await the next action. If the AP 213 crosses an allocation region boundary (mod(RP,K)==0) (Block 455), the ABIT field 225 for the reallocation region is tested against the allocation region skip criterion (ASKIP) (Block 460). If the access count in the AP-indexed ABIT field 235 is less than the skip criterion set by the CPU 210 (Block 460), the AP-indexed block may be allowed to be allocated during the next allocation region interval. If the access count in the AP-indexed ABIT field 225 meets the skip criterion set by the CPU 210 (Block 460), then the threshhold counter may be incremented and tested against the region skip limit (Block 465). If the limit is exceeded (Block 465), then the AP-indexed region becomes the next allocation region and the CPU 210 may await the next action. If the limit is not exceeded (Block 465), the AP may be incremented by region size RS to point to the next allocation region (Block 470) and may repeat the test loop.

Figure 5:
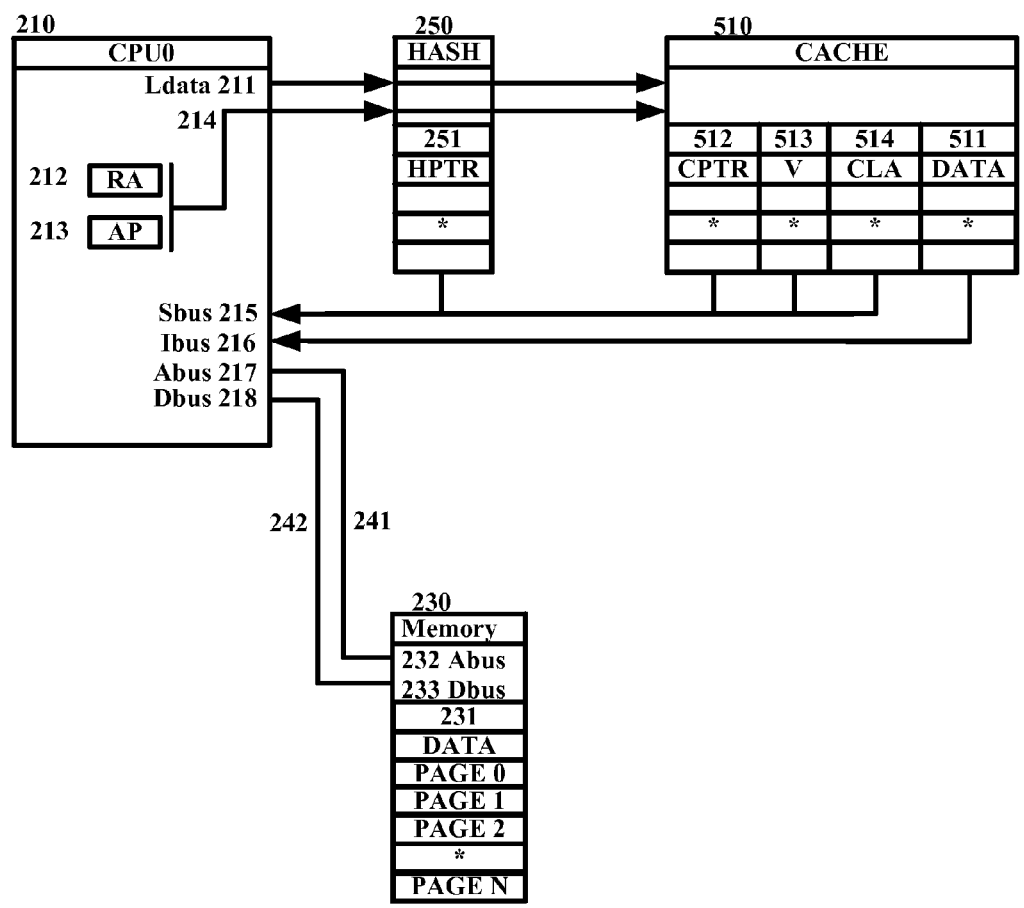
FIG. 5 is a diagram of one embodiment of a queue cache according to the present invention.

FIG. 5 illustrates in a block diagram one embodiment of a stack or Last-In, First-Out (LIFO) temporal-spatial cache design 500. This design 500 is equivalent to the design 200 of FIG. 2 except that the ABIT field 225 is not required. The cache 510 in this design may include a data entry 511, a cache pointer 512, a valid bit 513, and a cache logical address 514. This design 500 may concentrate on detecting the transition to a new working set. When a new working set is established, a period of high-frequency cache entry allocation may occur to bring the new working set into the cache. Once the working set has been initially established, a period of lower-frequency cache allocation to fill the cache with infrequently-accessed portions of the working set may follow. The stack allocation method may preserve the initially-allocated high-frequency cache entries by re-allocating from the lower-frequency set until the allocation frequency again approaches the value established by the last working set transition.

Cache allocation may be done in two phases: an initial or full phase and a partial phase. A full phase may allocate all cache entries 510 sequentially from the first entry at AP=0 to the last entry at AP=CS. The elapsed time consumed by the full phase may be recorded (Fti). Following the full phase, a partial phase may be initiated which sets the AP to an intermediate value X and then allocates all cache entries sequentially from the entry at AP=X to the last entry at AP=CS. The elapsed time consumed by the partial phase may be recorded (Ftc). The partial phase may preserve caches entries 0 through X−1.

Following the partial phase, the Ftc and Fti values may be compared. If the ratio Ftc/Fti exceeds a threshhold value (Y), the allocation frequency may be considered low and the AP 213 is set to X to initiate another partial phase and preserve cache entries 0 to X−1. If the ratio Ftc/Fti does not exceed a threshhold value (Y), the allocation frequency may be considered high, suggesting a change of working set and AP is set to 0 to initiate a full phase. Experimentation may be used to determine the optimum values of 'X' and 'Y' for best performance. Note that the allocation pointer may decrement, which has the same advantage as described above in connection with the queue structure.

FIG. 6 illustrates in a flowchart one embodiment 600 of a method of detecting the transition to a new working set. The CPU 210 may purge the hash table 250 and the cache pointer 512 (Block 605), initialize a full allocation cycle by setting the AP 213 to zero (Block 610), set the TYPE to full (Block 615), and setting the initial time (Ti) to the timestamp from a clock or other timekeeping device (Block 620). When the processor 210 requests allocation of a cache entry 510 (Block 625, the "Yes" path), the cache entry 510 indexed by the AP 213 is allocated (Block 630) and the AP 213 is incremented (Block 635). If the AP 213 points to a cache entry (i.e., if AP<=CS) (Block 640, the "Yes" path), the method may await the next allocation request (Block 625). When the AP increment overflows (i.e., AP>CS) (Block 640, the "No" path), the time to fill the cache (Tc) is saved as the timestamp value (Block 645) to be used to calculate cache fill time. If TYPE is set to full (Block 650, the "Yes" path), the initial fill time (FTi) is calculated (Block 655) and a partial allocation cycle is initiated by setting AP to X (Block 660), setting TYPE to partial (Block 665) and again setting the starting Ti (Block 620). If the TYPE is not set to full (Block 650, the "No" path), meaning that the just-ended allocation cycle was a partial allocation cycle, the current fill time FTc is calculated (Block 670) and the current FTc/FTi ratio is compared to the threshhold value Y (Block 675). If the threshhold value Y is exceeded (Block 675, the "Yes" path), a partial allocation sequence is initiated (Block 660). If the threshhold value Y is not exceeded (Block 675, the "No" path), a full allocation sequence is initiated as described above.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. In a computer system, the method comprising:
storing one or more data entries in a memory;
storing one or more cache entries of the one or more data entries in a cache;
measuring a first amount of time needed to initially fill the cache;
allocating a first number of cache entries to be replaced;
measuring a second amount of time needed to replace the first number of cache entries; and,
determining that the ratio of the second amount of time to the first amount of time is equal to or lower than a threshold value, allocating a second, different number of cache entries to be replaced.

2. The method of claim 1, further comprising:
determining that the ratio of the second amount of time to the first amount of time is greater than the threshold value, allocating a third amount of cache entries to be replaced, the third number being different than the first number and lower than the second number.

3. The method of claim 1, wherein the second number of cache entries is equal to all entries in the cache.

4. The method of claim 1, wherein the first number of cache entries is less than all entries in the cache.

5. The method of claim 1, wherein the first number of cache entries to be replaced is designated by the location of an allocation pointer.

6. The method of claim 1, wherein the threshold signifies a transition from a first working set to a second working set.

7. The method of claim 1, wherein the cache has a last-in, first-out temporal spatial design.

8. The method of claim 1, wherein the measuring of a first amount of time and the measuring of a second amount of time are performed by monitoring a clock.

9. The method of claim 1, wherein the measuring of the first amount of time is performed by the steps of:
   initializing an allocation pointer to zero and recording a start time;
   after filling a cache entry, indexing the allocation pointer; and,
   after detecting that the allocation pointer exceeds a value, recording a finish time.

10. The method of claim 1, wherein the measuring of the second amount of time is performed by the steps of:
    initializing an allocation pointer to a first value and recording a start time;
    after filling a cache entry, indexing the allocation pointer; and,
    after detecting that the allocation pointer exceeds a second value, recording a finish time.

11. A set of instructions residing in a storage medium, the set of instructions capable of being executed by a storage controller to implement a method for processing data, the method comprising:
    storing one or more data entries in a memory;
    storing one or more cache entries of the one or more data entries in a cache;
    measuring a first amount of time needed to initially fill the cache;
    allocating a first number of cache entries to be replaced;
    measuring a second amount of time needed to replace the first number of cache entries; and,
    determining that the ratio of the second amount of time to the first amount of time is equal to or lower than a threshold value, allocating a second, different number of cache entries to be replaced.

12. The set of instructions of claim 11, further comprising:
    determining that the ratio of the second amount of time to the first amount of time is greater than the threshold value, allocating a third amount of cache entries to be replaced, the third number being different than the first number and lower than the second number.

13. The set of instructions of claim 11, wherein the second number of cache entries is equal to all entries in the cache.

14. The set of instructions of claim 11, wherein the first number of cache entries is less than all entries in the cache.

15. The set of instructions of claim 11, wherein the first number of cache entries to be replaced is designated by the location of an allocation pointer.

16. The set of instructions of claim 11, wherein the threshold signifies a transition from a first working set to a second working set.

17. The set of instructions of claim 11, wherein the cache has a last-in, first-out temporal spatial design.

18. The set of instructions of claim 11, wherein the measuring of a first amount of time and the measuring of a second amount of time are performed by monitoring a clock.

19. The set of instructions of claim 11, wherein the measuring of the first amount of time is performed by the steps of:
    initializing an allocation pointer to zero and recording a start time;
    after filling a cache entry, indexing the allocation pointer; and,
    after detecting that the allocation pointer exceeds a value, recording a finish time.

20. The set of instructions of claim 11, wherein the measuring of the second amount of time is performed by the steps of:
    initializing an allocation pointer to a first value and recording a start time;
    after filling a cache entry, indexing the allocation pointer; and,
    after detecting that the allocation pointer exceeds a second value, recording a finish time.

* * * * *